United States Patent [19]

Masterton

[11] 4,099,187

[45] Jul. 4, 1978

[54] SHADOW MASK COLOR PICTURE TUBE HAVING A MOSAIC COLOR SCREEN WITH IMPROVED TOLERANCES

[75] Inventor: Walter David Masterton, Lititz, Pa.

[73] Assignee: RCA Corporation, New York, N.Y.

[21] Appl. No.: 741,057

[22] Filed: Nov. 11, 1976

Related U.S. Application Data

[62] Division of Ser. No. 605,123, Aug. 15, 1975, abandoned, which is a division of Ser. No. 147,776, May 28, 1971, abandoned.

[51] Int. Cl.2 .............. G03B 41/00

[52] U.S. Cl. .............. 354/1

[58] Field of Search .............. 354/1; 96/36.1, 38.3; 313/472

[56] References Cited

U.S. PATENT DOCUMENTS

| | | | |
|---|---|---|---|
| 3,592,112 | 7/1971 | Frey | 354/1 |
| 3,667,355 | 6/1972 | Ng et al. | 354/1 |
| 3,685,994 | 8/1972 | Frey | 96/36.1 |

*Primary Examiner*—John Gonzales

*Attorney, Agent, or Firm*—Eugene M. Whitacre; Glenn H. Bruestle; Dennis H. Irlbeck

[57] ABSTRACT

A variable density optical filter and method of making the filter are disclosed. The filter may be one of three filters used to expose a photosensitive coating in forming a color picture tube screen. The density of the filter varies in accordance with measured clipping and leaving tolerance of a completed tube formed without use of the filter.

1 Claim, 7 Drawing Figures

FIG. 1
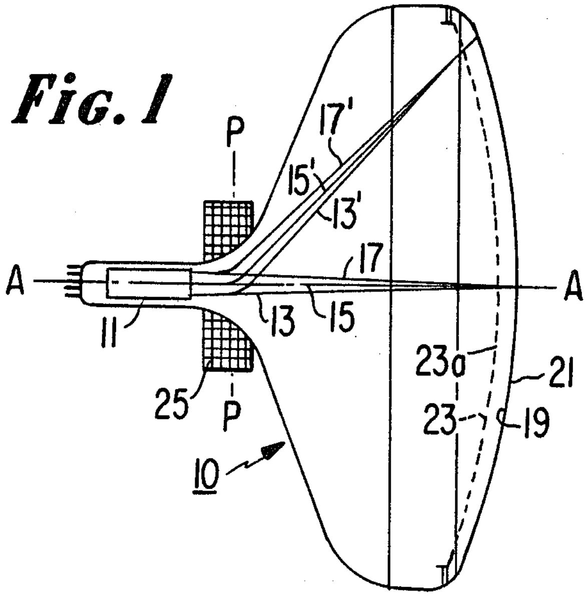
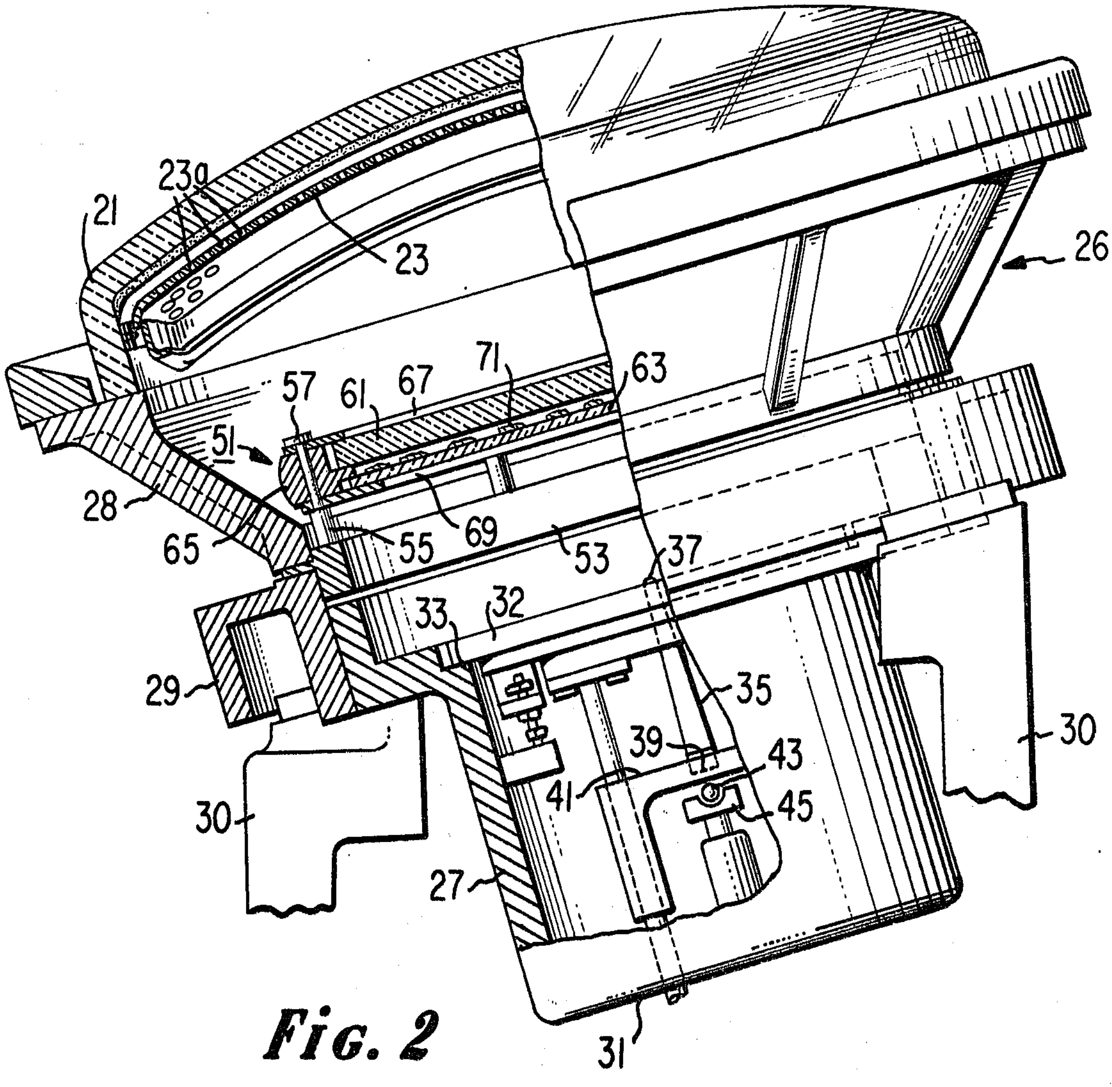
FIG. 2

SHADOW MASK COLOR PICTURE TUBE HAVING A MOSAIC COLOR SCREEN WITH IMPROVED TOLERANCES

This is a division of application Ser. No. 605,123, filed Aug. 15, 1975, now abandoned, which was a division of application Ser. No. 147,776 filed May 28, 1971, now abandoned.

BACKGROUND OF THE INVENTION

This invention relates to improvements in shadow mask color picture tubes and the manufacture thereof. Such a tube comprises a mosaic screen of sytematically arranged color phosphor elements, such as dots or lines, means including at least one electron gun for producing and directing a plurality of electron beams toward said screen, and a multi-apertured color selection shadow mask mounted between the electron gun means and the screen.

In a dot-type tube, the phosphor dots are usually laid down on the screen substrate, which is usually the tube faceplate, in trios or triangular groups of three circular dots of different color-emitting phosphors by a direct photographic printing technique wherein a photosensitive coating on the faceplate is exposed through circular apertures of the mask by a point source of light, and the coating is developed, as by washing off the unhardened portions, leaving the desired pattern of exposed hardened dots. This process is repeated for each color, e.g., red, green and blue. The shadow mask is preferably detachably mounted on the faceplate flange so that it can be easily removed and replaced in exactly the same position every time. Phosphor powder may, e.g., be mixed directly with each photosensitive coating before application to the faceplate, or else applied to the coating after the latter has been exposed.

In the operation of the tube, the electron beams are subjected to forces such as scanning (i.e., horizontal and vertical deflection) and dynamic convergence (to maintain convergence of the beams at the screen at various angles of deflection) which affect the electron beam paths and, hence, the landing points or spots on the screen, in ways that the screen-printing light rays are not affected. Thus, unless compensation is made for the differences between the beam paths and the light ray paths, serious misregister of the beam spots with the phosphor dots will result, i.e., the spot and dot centers will not coincide. The various kinds of misregister which may occur, and thus require compensation for, are described in columns 1 and 2 of Herzfeld et al. U.S. Pat. No. 3,476,025, issued Nov. 4, 1969. That patent discloses and claims a method of making a correction lens which, when used in the "lighthouse" for printing the mosaic screen of a shadow mask color tube, will refract the light rays from a point source in such manner as to provide acceptable compensation at each of a multiplicity of predetermined points distributed over the entire screen area for all conditions that tend to cause misregister of the spots and dots, at least for tubes up to 90° deflection (the example given in column 6 of the patent was a 19 inches rectangular 90° tube).

It has been found that, in making and using correction lenses for printing the screens of shadow mask color tubes, particularly those with substantially greater than 90° deflection, e.g., 110° deflection, undesirable conditions remain which are not susceptible to correction by a refracting lens. Such residual conditions include distortion of the triangles formed by the centers of the three dots of different colors in each trio away from equilateralism. The existence of such non-equilateral trios results in both overlapping of some dots of adjacent phosphor trios and unnecessary spacing of other adjacent dots. Depending on the kind of correction lens used in printing the mosaic screen, this non-equilateral distortion may be a maximum at the ends of the major and minor axes and a minimum at the center of the screen, or may be variable over the entire screen. In some cases, particularly where the screen is printed by the process of "second order printing". as disclosed in Morrel et al. U.S. Pat. No. 3,282,691, issued Nov. 1, 1966, the beam spots are substantially concentric or registered with their respective phosphor dots, even where the dot trios are distorted out of parallelism. However, in most cases, particularly at high deflection angles, the beam spots are exactly registered with the dots of the distorted trios. Depending on the amount of such misregister, this misregister may result in insufficient spot-dot tolerances, i.e. white uniformity or leaving tolerance, and/or color purity or clipping tolerance. White uniformity or leaving tlerance is the minimum distance (e.g. in mils) that a particular beam spot can move with respect to its respective phosphor dot without extending beyond (or beginning to leave) that dot. The leaving tolerance is, therefore, the shortest distance between the edges of the dot and its beam spot. Where the beam spots are smaller than the dots (positive tolerance tube) if a particular spot extends beyond its dot (negative tolerance dot condition) the amount of that particular color light emitted will be less than normal, which will change the white balance of the three color dots, and hence, reduce the white uniformity at that particular trio. The purity or clipping tolerance of a particular color dot is the shortest distance between the edge of that dot and the edge of the nearest beam spot associated with a different color dot, or the distance that such nearest beam spot can move toward the particular dot before touching or "clipping" that dot. Such clipping, in a tube used for color television picture reproduction, would result in a reduction in color purity at that point on the screen, because the clipping beam being modulated with color video information for one color would produce some light of a different color.

SUMMARY OF THE INVENTION

An object of the present invention is to provide a shadow mask color picture tube having a mosaic color phosphor screen with improved tolerances between the color phosphor elements and the electron beam spots.

The improvements in tolerance may be produced by systematically increasing or decreasing the size of one or more of the different color phosphor elements in each trio, as required, at least in each of those regions of the screen where improvement is needed, to produce a desired balance the minimum clipping and leaving tolerances for each color. Preferably, the sizes of the phosphor elements are chosen to improve the tolerance at predetermined small regions distributed over the entire screen area. Preferably also, the minimum leaving and clipping tolerances for each phosphor element are made substantially equal. However, in some cases, it may be desirable to make the clipping tolerance somewhat greater than the corresponding leaving tolerance.

BRIEF DESCRIPTION OF THE DRAWING

FIG. 1 is a schematic side view of a shadow mask color picture tube in which the invention is incorporated.

FIG. 2 is an axial section view of screen printing "lighthouse" on which the faceplate panel assembly of the tube is mounted during manufacture.

DETAILED DESCRIPTION OF THE PREFERRED EMBODIMENTS

Figure 3:
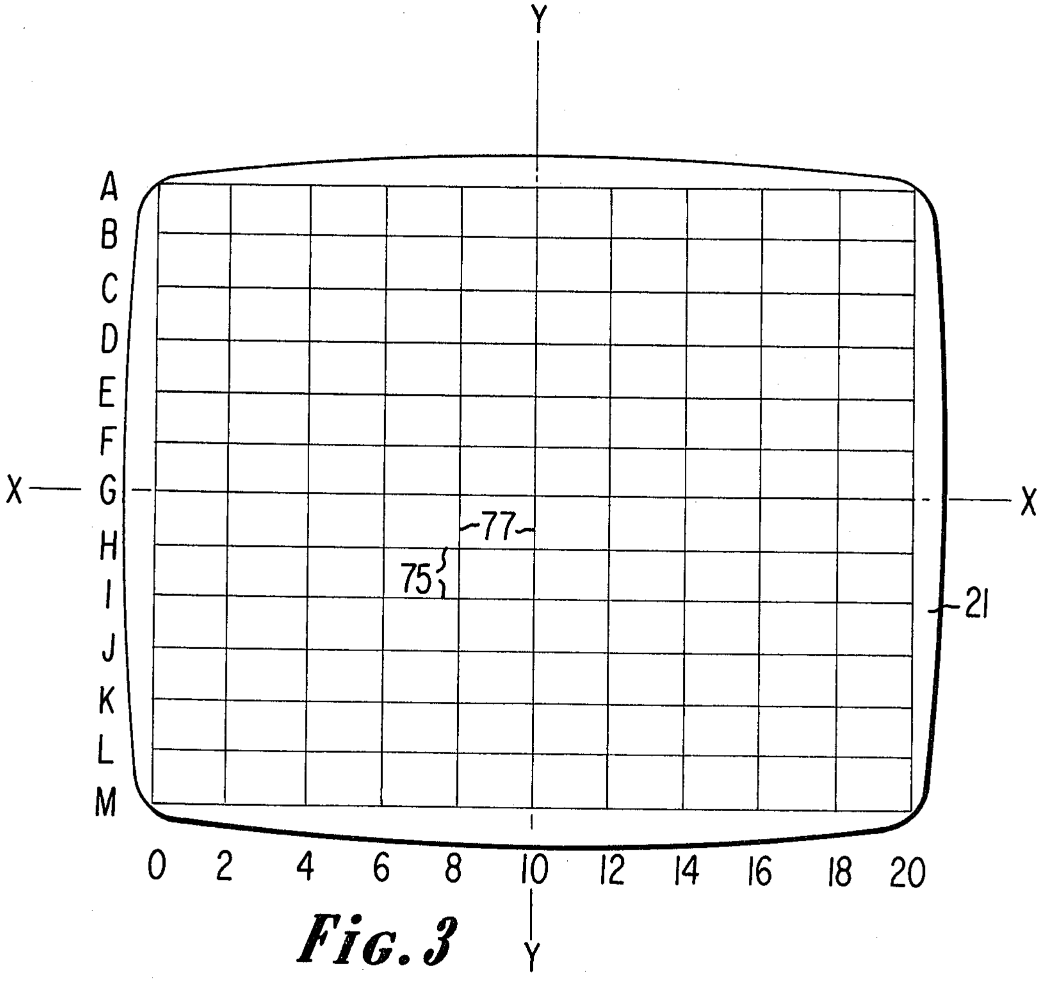
FIG. 3 is a front end view of the tube faceplate illustrating a grid of intersecting lines determining a pattern of points for measuring spot-dot misregister.

FIG. 1 schematically illustrates a color picture tube of the type described which comprises an envelope 10 containing a conventional electron gun 11, such as that disclosed in Hughes U.S. Pat. No. 3,254,251 issued May 31, 1966, for producing and directing three electron beams along paths 13, 15 and 17 toward a mosaic color phosphor screen 19 disposed on the inner surface of a faceplate 21 forming part of the envelope 10. A multi-apertured color selection shadow mask 23 is mounted near but spaced from the screen 19 in the paths of the beams. Preferably, the gun structure 11 produces a trangular or delta array of beams, and the mask 23 is formed with a multiplicity of small circular apertures 23*a* systematically arranged in a diamond-shaped array. The mosaic screen 19 comprises a multiplicity of color phosphor elements in the form of circular dots (see FIG. 4) arranged in a generally hexagonal array, with a trio or triangular group of three dots each of a different color emitting phosphor (e.g. red, green and blue dots) associated with each aperture 23*a* of the mask 23.

In operation of the tube, the three electron beams are directed to be converged to a cross-over near the screen 19 by virtue of the mechanical structure of the electron gun 11 and/or beam convergence forces generated by external means (not shown). Each of the three beams approaches the mask 23 and portions thereof pass through the apertures 23a and impinge essentially only on phosphor dots which emit light of the same color. The beams are deflected in horizontal and vertical directions to scan the screen 19 by a conventional scanning yoke 25, one deflected position being shown by paths 13', 15' and 17'. The initial plane of deflection is normal to the longitudinal central axis A-A of the tube and is located approximately in the center of the scanning yoke 25. The center of deflection of each beam is the point of intersection of the beam path (extended) with the plane P-P. As the deflection angle increases (from zero) the effective plane of deflection shifts axially toward the screen.

FIG. 2 illustrates a lighthouse apparatus that may be used for printing a mosaic color phosphor screen of a shadow mask color tube. The lighthouse 26 comprises a light box 27 and a faceplate panel support 28 held in position by bolts (not shown) with respect to one another on base 29 which in turn is supported at a desired angle by legs 30. The light box 27 is a cylindrical cup-shaped casting closed at one end by an integral end wall 31. The other end of the light box 27 is nearly closed by a plate 32 which fits in a circular recess 33 in the light box 27. The plate 32 has central hole therein through which a light pipe or collimator 35 in the form of a tapered glass rod extends. The small end of the light pipe 35 extends slightly beyond the plate 31 and constitutes a point source of light for the lighthouse. The larger end of the light pipe is supported, by a bracket 41, opposite a lamp 43 mounted within the light box 27. A correction lens assembly 51 is mounted on a lens assembly support ring 53 and stand off spacers 55 by bolts 57. The support ring 53 is clamped between the light box 27 and the panel support 28. The lens assembly 51 may be made up of two separate lenses 61 and 63, for making different kinds of optical corrections, held and spaced from each other by a separator ring 65, an upper clamp 67 and a lower clamp 69. Alternatively, a single correction lens may be used. The upper surface of lens 63 has thereon a variable density optical filter 71, such as that described in U.S. Pat. No. 3,592,112 issued to Harold R. Frey, on July 13, 1971. The filter 71 may be made of pre-formed carbon particles (mean diameter about 10 millimicrons) in gelatin or other clear colorless binder, and varies in thickness up to about a half wavelength for yellow light. This filter has essentially a neutral gray transmittance varying only in the intensity of grayness. The intensity of grayness varies from point-to-point so that point-to-point variations in brightness in the light field are produced. The primary function of the filter 71 is to increase the light exposure of the portions of the faceplate at the peripheral edges to compensate for the fact that the mask apertures are made smaller at the edges than at the center to improve the tolerances, and for the normal reduction in light intensity at the edges due to the inverse square law.

The phosphor dots of each color (e.g., red) are usually formed on the faceplate of the tube by:

1 coating the inner surface of the faceplate 21 with a photosensitive material which will harden when exposed to light, which may be mixed with particles of the particular color being printed;

2 assembling the shadow mask 23 with the faceplate and mounting the assembly on a lighthouse (e.g., 26) containing a light source 35 and one or more lenses 61,63 which have been designed to refract the light rays in such manner as to compensate for deviations of the electron beam paths from the normal straight line light paths (e.g., as in Herzfeld et al. U.S. pat. No. 3,476,025) in order to produce substantial registration of the beam spots and phosphor dots in the subsequent operation of the tube;

3 Exposing the photosensitive coating to light passing through the lens assembly (including a variable density filter 71) and the mask apertures to harden dot portions of the coating;

4 Developing the coating by washing off the unhardened portions between the hardened dot portions; and 5 Coating the dot portions with the desired color phosphor material, if the phosphor material was not incorporated with the coating mixture.

The phosphor dots of the other colors (e.g. green and blue) are formed on the faceplate by repeating the process described. In each case, usually in a different lighthouse, the light source is positioned at the center of deflection of the particular color being printed, or at a point related thereto, and a different lens assembly is used, designed for that particular color.

It is customary to inspect some tubes during operation at a predetermined multiplicity of points distributed over the entire screen area, for example at the points of intersection of a grid of intersecting horizontal and vertical lines 75 and 77, as shown in FIG. 3 on the faceplate 21, through a microscope (not shown) to determine what misregister and/or trio distortion are present in the neighborhood of each point. Photomicrographs may be made at each point of a group of enlarged phosphor dots and their respective superimposed beam spots. A triangular group of six dots, including one trio of dots and three adjacent dots, is selected and carefully plotted on a larger scale, as shown in FIG. 4.

Figure 4:
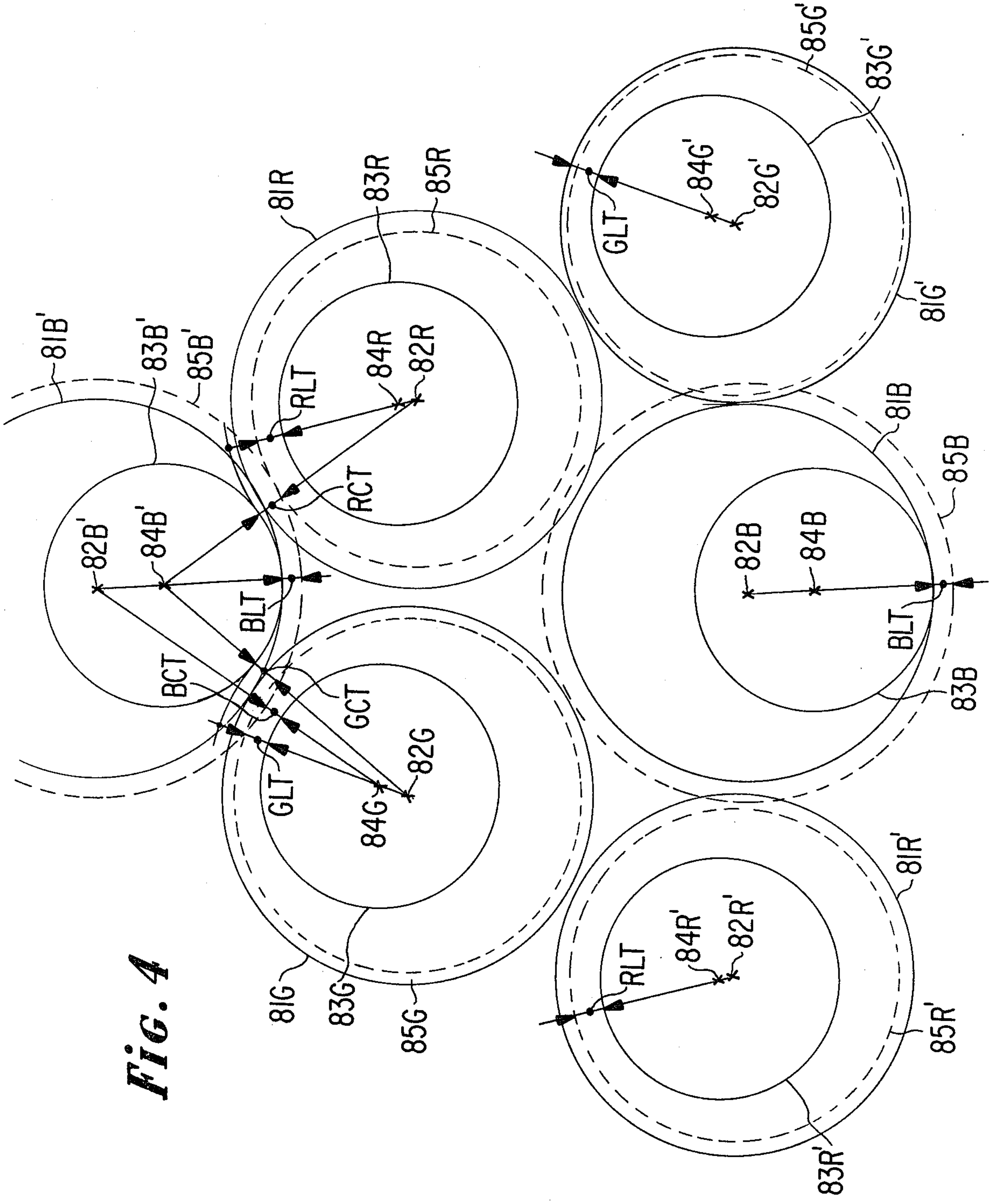
FIG. 4 is a typical plot showing the relative positions of six phosphor dots and their associated beam spots in the neighborhood of one of the points in FIG. 3.

FIG. 4 shows a typical trio of circular phosphor dots 81, made up of a red dot 81R, a green dot 81G and a blue dot 81B, with three adjacent dots 81R', 81G' and 81B', shown by the large solid circles, having centers 82R, 82G, 82B, 82R', 82G' and 82B', as printed in accordance with the prior art with substantially uniform size in each small region of the screen. The size of these dots usually varies in different regions due to radial grading of the mask apertures and the variable density of the filter (71). The circular beam spots 83R, 83G and 83B of the typical trio of dots, and the adjacent spots 83R', 83G' and 83B' are shown by the small solid circles, having centers 84R, 84G, 84B, 84R', 84G' and 84B'. Due to the finite size of the beam source and the geometry of the tube, the beam spot includes an inner umbra, an outer penumbra and an intermediate size or diameter which determines the brightness of the light emitted. For tolerance purposes, the maximum or penumbra is usually used.

The first step in analyzing a plot as in FIG. 4 is to determine the most critical condition, i.e., the smallest leaving or clipping tolerance. A small (or negative) clipping tolerance is considered more critical than an equal leaving tolerance, because a color purity defect in the picture is more noticeable to the eye than an equal white uniformity defect. In the particular example shown, the two tolerances are considered equally critical.

First, the tolerances for the typical trio of dots will be considered. It should be noted that the leaving tolerance is measured along a line extending through the centers of each dot and its respective spot, and the clipping tolerance for a particular dot with respect to a particular adjacent beam spot is measured along a line joining the centers of the particular dot and spot involved. It is apparent that the most critical tolerance involved in FIG. 4 is the leaving tolerance for the blue dot 81B (and 81B'), which is zero (tangent dot and spot). On the other hand, the minimum clipping tolerance for the same (blue) dot, which is the shortest distance between the blue dot 81B' and the nearest adjacent green dot 81G, is greater than necessary.

The leaving tolerance can be increased, or improved, by trading some of the excess blue clipping tolerance for more (in this case, some) blue leaving tolerance. This is done by increasing the size or diameter of the blue dots in this region by an amount which may be one-half of the difference between the two tolerances (in this case, one-half of the blue clipping tolerance). The outlines of the enlarged blue dots are shown in FIG. 4 by dotted circles 85B and 85B'. This, of course, results in equal leaving and clipping tolerances for the blue dots. However, since clipping tolerance is more critical than leaving tolerance, it may be desirable to increase the blue leaving tolerance by a smaller amount, so that the blue leaving tolerance is, for example, one-half or one third of the clipping tolerance.

Another critical tolerance in FIG. 4 is the small clipping tolerance for the red dot 81R with respect to the adjacent blue spot 83B', as compared to the relatively large leaving tolerance for that dot (81R). The red clipping tolerance is increased and the red leaving tolerance is decreased in this region by decreasing the size of the red dots. As shown, the amount of the decrease in size is one-half of the sum of the two original red tolerances, so that the new red dots 85R and 85R' have equal leaving and clipping tolerances.

The minimum clipping tolerance for the green dot 81G (with respect to the blue spot 83B') is almost equal to the green leaving tolerance in FIG. 4. However, since the clipping tolerance should be at least equal to the leaving tolerance, the size of the green dots is decreased in this region, as shown by the new dots 85G and 85G', in the same manner as the red dots, to make the green clipping tolerance equal to the green leaving tolerance. Since the most critical (smallest) leaving and clipping tolerances have been considered and improved, it is not necessary to consider any other relationships in FIG. 4. Thus, the dotted circles in FIG. 4 determine the three different dot diameters required in a particular region of the screen to produce the desired leaving and clipping tolerances for each of the three colors in that region.

A similar analysis is made at each of the screen points chosen for measurement, and the new values of dot diameter, leaving tolerance and clipping tolerance at each point are listed in three separate tables, one for each color. These values are used to modify the light filter 71, that was used in the lighthouse in printing the screen of the emperimental tube described above, in such manner that the phosphor dots printed with the modified filter will have substantially the desired new diameters for improving the tolerances.

Figure 5:
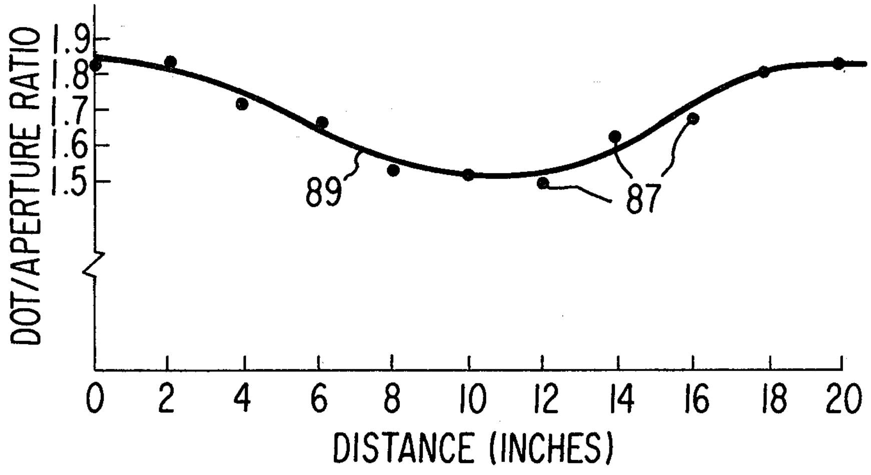
FIG. 5 is a graph which is used in determining the optimum size of the phosphor dots.
Figure 6:
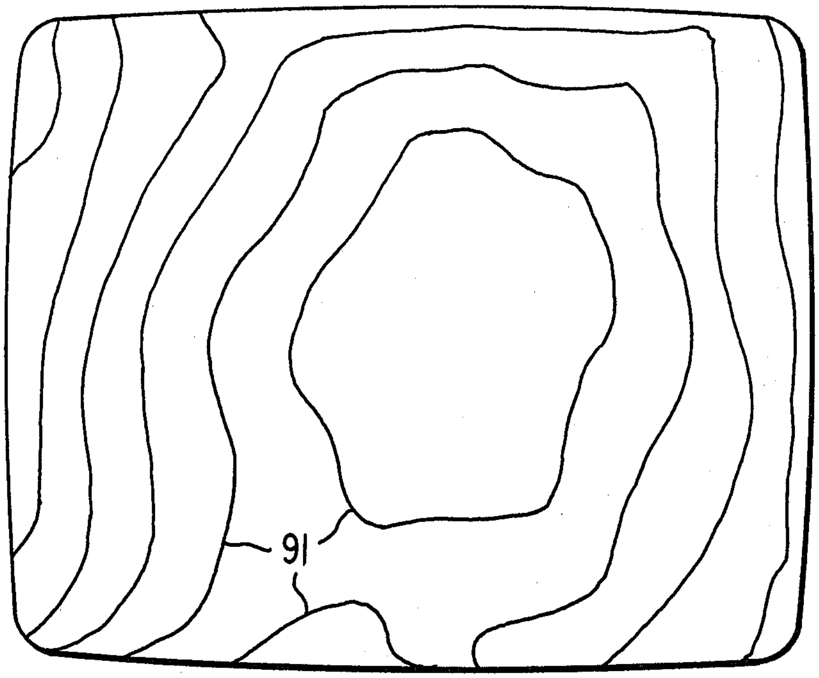
FIG. 6 is a plot of curves of equal dot to aperture ratio on the screen.

First, each new dot diameter is divided by the known mask aperture at the same point (determined from the grading curves for the mask used) and the resulting ratios are plotted, with respect to position on the screen, as by assigning numbers to the points of intersection of the lines 75 and 77 in FIG. 3, Then, the ratios along each horizontal line 75 (A through M) are separately plotted against distance across the screen, as shown, for example, by the dots 87 in FIG. 5. The irregularities of these ratios along each horizontal line 75 are smoothed out by drawing a smooth curve 89 approximating the points 87. within the limits permitted by the new tolerances at each point. The ratios determined by the curves 89 for the horizontal lines A through M at each of the positions 0 through 20 of FIG. 3 are separately plotted along the vertical lines 77, and each set of plotted ratios are approximated by a smooth curve, in the same manner as in FIG. 5 for the horizontal lines 77. Next, the smoothed ratios at the selected points determined by the set of vertical curves are plotted with respect to position on the screen, with a separate plot for each color, and curves 91 are drawn through equal ratios, as shown in FIG. 6. This set of curves 91 represents the desired variation in dot diameter for one of the three colors.

The pattern of curves 91 for each color may be reproduced on the bottom surface of the correction lens 63 for that color in FIG. 2, or on a separate glass plate substantially in the same plane, the tracing rays of light from points on the curves 91 through the correction lenses 61 and 63 to the light source 37, in the manner described in Herzfeld et al U.S. pat. No. 3,476,025 in connection with FIGS. 4 and 5 thereof. The ratios associated with the curves 91 are converted to filter densities required to print phosphor dots having diameters corresponding to the ratios, and then a new light filter having the required pattern is fabricated to replace the original filter 71. The new filter may be formed by coating the upper surface of lens 63 with a filter material the density of which can be varied by exposing it to light, and exposing the coating to light from the source 37 through a stack of suitable thin neutral density light filters each having a contour matching one of the density curves.

This new light filter is then used in the lighthouse in printing the pattern of dots of one of the three colors on the faceplate. The dots of each of the other two colors are similarly printed by a lighthouse containing light filter designed to produce the desired dot diameters for the particular color involved.

Figure 7:
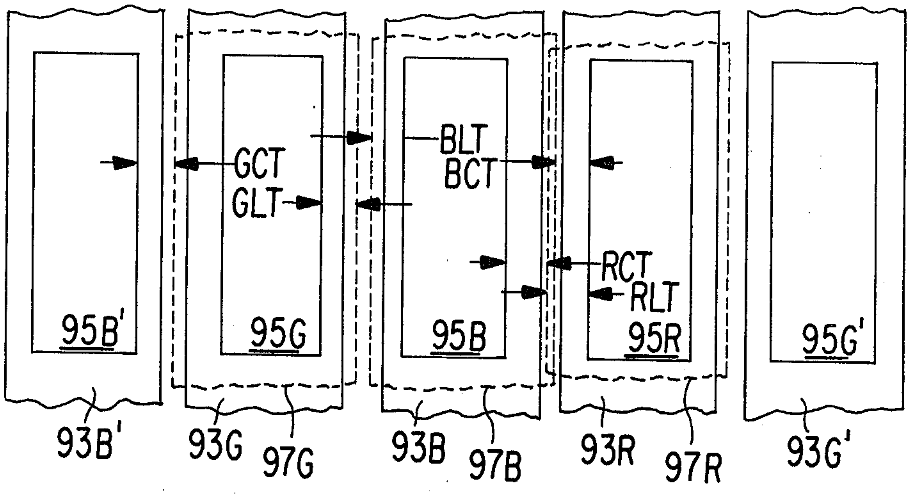
FIG. 7 shows a portion of a screen having phosphor elements and associated beam spots other than circular.

The invention can also be applied to a shadow mask type color tube having phosphor elements and associated beam spots other than circular. FIG. 7 shows a portion of the screen of a line-screen tube having elongated mask apertures producing elongated beam spots. The screen comprises red, blue and green elongated phosphor strips 93R, 93G and 93B constituting a typical trio associated with a particular mask aperture, and two adjacent strips 93B' and 93G', as shown. The associated beam spots are 95R, 95G, 95B, 95B' and 95G'. In the example shown, the spacings between the beam spots are substantially the same, but the green and blue strips (93G and 93B) have a spacing substantially greater than the blue and red strips (93B and 93R). This results in unequal leaving and clipping tolerances for each color. In this case, the width of each of the phosphor strips is increased an amount sufficient to make the leaving and clipping tolerances equal for each color, as shown by the widened strips 97R, 97G and 97B.

I claim:

1. In a pair of variable density filters for use in photoprinting a color picture tube screen, said screen comprising a mosaic of interleaved arrays of different coloremitting phosphor elements, one of said filters intended for use in printing one of the color arrays and the other of said filters intended for printing another of the color arrays, said filters having optical density variations for purposes taught in the prior art, the improvement wherein each of said filters at at least one corresponding location thereon have modified densities to effect an enlargement of one color phosphor element of a given trio of phosphor elements and a corresponding decrease in size of another phosphor element of the same trio.

* * * * *